United States Patent
Stanton et al.

(10) Patent No.: US 7,188,158 B1
(45) Date of Patent: Mar. 6, 2007

(54) SYSTEM AND METHOD FOR COMPONENT-BASED SOFTWARE DEVELOPMENT

(75) Inventors: David Stanton, San Francisco, CA (US); Mark Potts, San Francisco, CA (US); Sameer Vaidya, San Francisco, CA (US); Mark Perreira, San Francisco, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1309 days.

(21) Appl. No.: 09/616,330

(22) Filed: Jul. 15, 2000

(51) Int. Cl.
*G06F 15/177* (2006.01)
(52) U.S. Cl. .................................................. 709/220
(58) Field of Classification Search .............. 709/201, 709/206, 220, 247; 717/120, 107
See application file for complete search history.

(56) References Cited

U.S. PATENT DOCUMENTS

| | | | |
|---|---|---|---|
| 6,266,666 B1* | 7/2001 | Ireland et al. ................ 707/10 |
| 6,282,580 B1* | 8/2001 | Chang ........................ 719/316 |
| 6,418,448 B1* | 7/2002 | Sarkar ..................... 707/104.1 |
| 6,421,707 B1* | 7/2002 | Miller et al. ................ 709/206 |
| 6,542,515 B1* | 4/2003 | Kumar et al. ............... 370/463 |
| 6,560,606 B1* | 5/2003 | Young ........................ 707/100 |
| 6,643,652 B2* | 11/2003 | Helgeson et al. ............ 707/10 |
| 6,691,232 B1* | 2/2004 | Wood et al. ................ 713/201 |
| 6,732,175 B1* | 5/2004 | Abjanic ...................... 709/227 |
| 6,748,569 B1* | 6/2004 | Brooke et al. .............. 715/523 |
| 6,757,899 B2* | 6/2004 | Zhdankin et al. ........... 719/315 |
| 6,772,216 B1* | 8/2004 | Ankireddipally et al. ... 709/230 |

OTHER PUBLICATIONS

Aaron Skonnard; "SOAP: The Simple Object Access Protocol" From the Jan. 2000 issue of Microsoft Internet Developer. Retrieve from http://www.microsoft.com/mind/0100/soap/soap.asp on Jul. 12, 2004.*
Box, Don et al.; "Simple Object Access Protocol (SOAP) 1.1" W3C Note May 8, 2000. Retrieved from http://www.w3.org/TR/2000/NOTE-SOAP-20000508/ on Jul. 9, 2004.*

(Continued)

*Primary Examiner*—William Vaughn
*Assistant Examiner*—Greg Bengzon

(57) ABSTRACT

An enterprise component-based software development system includes a component platform with a number of development tools and services that enable rapid and straightforward development of component-based systems. The component platform describes a middle tier architecture for a multi-tier, multi-user application. It defines the services and facilities as well as the structure in which components can execute. It helps to provide an extensible platform for the construction, management and execution of component-based software. A messaging platform facilitates communication between different computers. When a component requests a service from another component, the request is serialized and encoded into a platform-independent language such as XML. The XML-encoded message is transmitted over the Internet using an HTTP protocol to a receiving computer, which validates the message and delivers it to the component providing the requested service. Since XML is a platform and architecture independent language, requests processed in this way can be used by a wide variety of disparate systems.

23 Claims, 11 Drawing Sheets

OTHER PUBLICATIONS

Moshfeghi, M.; de Greef, B.; "XML in a multi-tier Java/CORBA architecture" Enabling Technologies: Infrastructure for Collaborative Enterprises, 1999. (Wet Ice '99) Proceedings. IEEE 8th International Workshop on , Jun. 16-18, 1999.*

Suzuki, J.; Yamamoto, Y.; "Toward the interoperable software design models: quartet of UML, XML, DOM and CORBA" Software Engineering Standards, 1999. Proceedings. Fourth IEEE International Symposium and Forum on , May 17-21, 1999 ☐☐pp. 163-172.*

Baker, S.; Cahill, V.; Nixon, P.; "Bridging boundaries: CORBA in perspective" Internet Computing, IEEE , vol. 1, issue: 5, Sep.-Oct. 1997 pp. 52-57.*

* cited by examiner

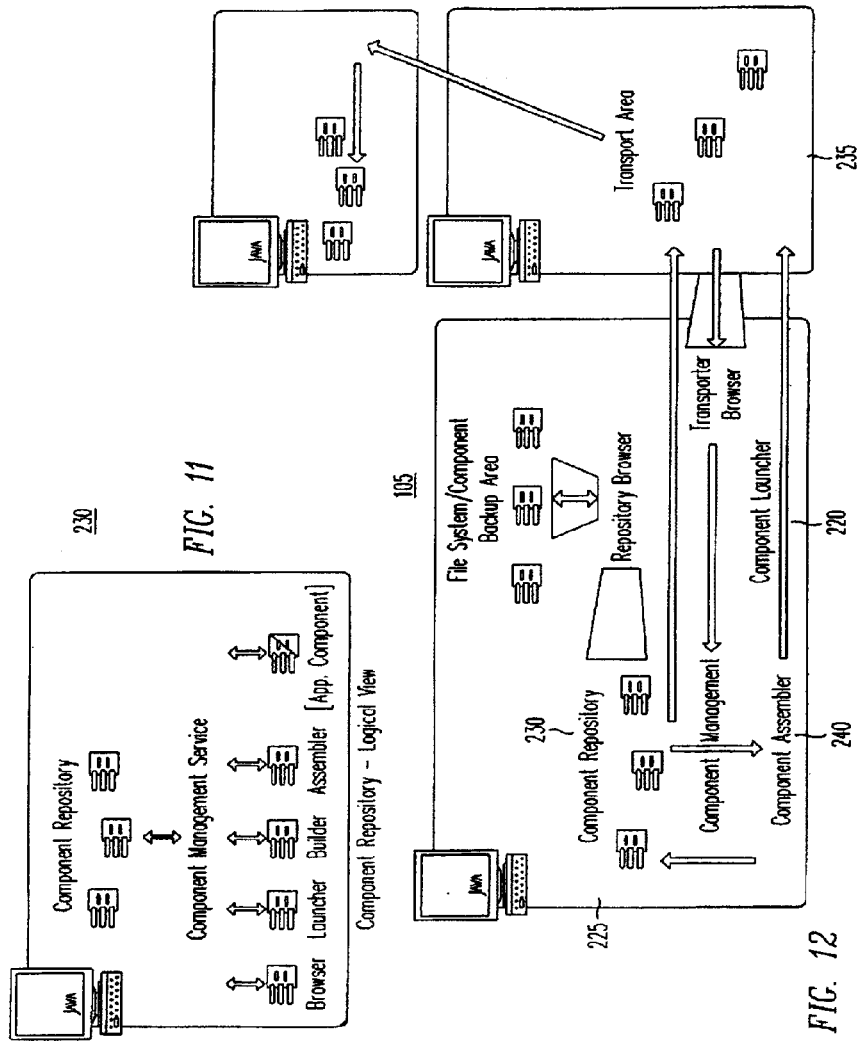

SYSTEM AND METHOD FOR COMPONENT-BASED SOFTWARE DEVELOPMENT

BACKGROUND OF THE INVENTION

1. Field of the Invention

The present invention is directed to computer software development and communications between computer systems. More specifically, the present invention is directed to enterprise component-based software development and to platform and architecture independent communications between disparate computer systems based thereon.

2. Background of the Related Art

The Internet has opened up the world as a single marketplace where organizations of all sizes can do business and compete. Organizations across the globe are racing to capitalize on the opportunities and increase their competitive advantage using this emergent technology. Recently, enterprise computing has been faced with ever-growing challenges now that many businesses are entering the e-commerce arena and a network economy in which transactions and information are exchanged not just inside their own enterprise, but also between enterprises in business-to-business (B2B) transactions. The architectures once defined and distinct to the enterprise and between defined enterprises are now extended to a higher level. Applications and the business functionality they encapsulate are now being offered as enterprise components within inter-enterprise business processes that connect suppliers, customers, and partners through the Internet.

The evolution of extended enterprises and virtual enterprises precludes a reliance on homogenous environments and proprietary Application Program Interfaces (APIs). Companies have to absorb an array of differing hardware and software solutions while maintaining open integration avenues. B2B applications require infrastructure that is capable of transacting against a diverse set of software and hardware and through different integration technologies.

Nearly all enterprise systems today are transactional in nature. That is, enterprise systems define functionality in terms of sets of operations, where all the operations need to succeed or fail together as a concise unit of work. Enterprise components need to be de-coupled from any specific context in which they are used, including the transactional context, but also need to maintain the ability to enroll in transactions that may start and end outside their boundaries.

Enterprises have made use of transaction processing (TP) monitors for inter-enterprise transactional integration, but their reliance on proprietary communication protocols make managing transactions that span multiple enterprises difficult at best. Managing transactions for the extended enterprise or B2B using the Web becomes an even more daunting task.

Enterprise components in most cases encapsulate or grant access to company-sensitive information and as such need to be able to authenticate the identity of users, control user access to particular services, and provide irrefutable evidence of their involvement in a transaction (non-repudiation). Collaboration between enterprise components requires security measures that support public-key security infrastructure, such as SSL, and integration to existing enterprise security infrastructure to ensure seamless, end-to-end security. Firewalls have provided a way for enterprises to protect their information and systems, but for the extended enterprise and virtual enterprise, firewalls get in the way.

What is needed is a component-oriented framework analogous to the application framework. The framework needs to offer the flexibility of defining a standard application development model which is agnostic to the current set of middleware component models, while structuring such flexibility in ways that deliver a consistent development model and roadmap for the development of business applications that combine components and services from the disparate environments.

SUMMARY OF THE INVENTION

In view of the above shortcomings of the prior art, it is an object of the present invention to provide an extensible platform for the construction, management and execution of component-based software.

It is a further object of the present invention to provide a component-based software development system which is largely vendor and platform neutral.

It is a further object of the present invention to provide a component-based software system capable of creating useful macro-components which provide a superior foundation for software development and reuse.

It is a further object of the present invention to provide a messaging platform capable of integrating systems and components of a heterogeneous nature and connecting systems within and across an extended enterprise.

It is a further object of the present invention to provide a component-based development system which decouples components from specific contexts in which they are used while maintaining the ability to enroll into transactions that may start and end outside their boundaries.

The above objects are achieved according to an aspect of the present invention by providing an enterprise component-based software development system capable of developing a messaging platform for communicating between computers. The development system includes a component platform with a number of development tools and services that enable rapid and straightforward development of component-based systems. To facilitate the above functionality, the preferred embodiment of the present invention provides a component platform encompassing an open set of technologies and tools working in unison to realize enterprise component based development. The component platform defines the services and facilities as well as the structure in which components can execute as well as provides an extensible platform for the construction, deployment, management, execution and evolution of component-based software.

Further, when a component requests a service from another component, the request is serialized and encoded into an Extensible Markup Language (XML) format. The XML-encoded message is transmitted over the Internet using Hypertext Transport Protocol (HTTP) or any other transport protocol chosen, to a receiving computer, which validates the message and delivers it to the component providing the requested service. Since XML is a platform and architecture independent language, requests processed in this way can be used by a wide variety of different systems.

As noted above, one of the messaging platform's benefits is that it provides a way for disparate systems to communicate. This is accomplished through the use of supported and tested standards such as XML, HTTP, and SOAP, TIP and SSL. The messaging platform provides numerous other benefits including:

Choice of transport and encoding mechanisms. By default, the messaging platform uses some specific protocols, such as HTTP for message transport and SOAP for message encoding. However, users can adopt other protocols easily. For example, FTP could be used instead of HTTP and known messaging standards such as COINS or XML-RPC could be used instead of SOAP.

Flexible XML layout options. The messaging platform allows users to determine the layout of their XML documents to structure them so that they will be understandable to remote systems.

Choice of DOM implementation. As is known in the art, a Document Object Model (DOM) determines how the information in an XML document is read and processed by the system. Different companies and organizations have created numerous DOM implementations. A messaging platform in the system preferably uses Sun Microsystems' DOM by default; however, one can use any other DOM instead. In fact, the messaging platform provides users with the flexibility to implement any DOM and SAX combination. For example, one could implement Sun's DOM and IBM's SAX parser.

Choice of schema. As is known in the art, schemas are documents that describe the information contained in XML documents. The messaging platform provides users with some default schema, but does not limit them to their use. The messaging platform supports any chosen schema. This means that one can use a standard schema, a standard schema with some customization, or a schema that is unique.

Schema generation. The messaging platform provides a GUI tool called the schema generator that automates the creation of schemas and the serialization of objects. The schema generator's GUI provides a simple and quick way to select the fields to be included in the schema and its serialized object, thus making it easy to modify schema and serialized objects during the development process.

Object neutrality. The messaging platform accommodates for differences in the way systems "think about" information. For example, a sender system might conceptualize an entity that contains customer information as "Customer." However, the recipient system might consider that information to be and entity that it recognizes as a "Supplier." Despite their differences, these systems can exchange customer information because the messaging platform transmits data in a neutral manner through the use of schemas. As long as the two systems agree to use the same schema, they can exchange information and collaborate seamlessly.

Support for XSL. Because not everyone will want to encode objects using SOAP, the messaging platform supports the use of XSL for formatting and presenting complex XML documents. The messaging platform provides SAXON 4.5 as the XSL engine; however, a user can replace it with the XSL processor of his choice.

Component-based Development (CBD) today is recognized as the best approach to reducing costs and time to market for the development of business systems. CBD has been defined as an approach in which all artifacts, including executable code, interfaces, architectures, of disparate granularity can be built by assembly, adapting and 'wiring' together existing components into a variety of configurations.

Enterprise Component Platform (ECP) is a standards based comprehensive solution to developing enterprise-scale distributed systems, through a holistic component based approach. ECP provides frameworks, prefabricated enterprise components, and an architecture and toolkit that support the definition, development, assembly, deployment, execution, management and evolution of enterprise components.

By defining systems in terms of federations of enterprise components, ECP addresses the challenges of controlling the complexity and risk in developing large, enterprise-level distributed systems in a way that supports the iterative, incremental development, management and evolution of systems.

ECP defines components as any artifact that is specified, constructed and deployed as a discrete unit. The ECP architecture and tool set provides the same services and facilities to components of all levels. However, the ECP focus is on enterprise components needed for enterprise-scale, distributed component-based systems.

Enterprise components systems as well as units of aggregation ECs can also be integrated and assembled into federations that extend the enterprise (supporting the extended and virtual enterprise models). By supporting the native protocols, as well as Internet protocols (such as HTTP, HTTPS, SSL, SOAP, and TIP) and semantic data standards (common repositories of XML-schema that can be shared between enterprises and their systems), enterprise components can integrate and collaborate, in a flexible and evolutionary manner, with systems outside their direct architectural scope. For example, enterprise components can access the services of a different remote enterprise, even when the services are offered from a proprietary architecture/technology, such as an ERP system.

Enterprise components are autonomous (outside their declared dependencies on other defined components) but still require an execution environment to be deployed to. The enterprise component platform leverages and augments the commercially available execution environments for distributed components (e.g., EJB: iPlanet iAS 6.0, BEA WebLogic 5.1, IBM WebSphere 3.0). The ECEE augments these execution environments offering features not supported by individual models but required for enterprise component-based development.

ECP also supports integration between enterprise components developed and deployed with disparate distributed component technologies and execution environments as well as other middleware such as message oriented middleware (MOM) for asynchronous messaging.

ECP is the only comprehensive solution for controlling the complexity and risk in developing large-scale distributed systems, through a holistic component based approach that:

Defines components at the next architectural level, above distributed components, allowing for the development of components from disparate component models, developed in different languages, within a heterogeneous environment.

Supports and augments the leading component execution environments, allowing them to be integrated into a single enterprise component execution environment (ECEE) to deploy enterprise components.

Eases development complexity by supporting a discrete recursive breakdown of problem domains in terms of components, that is architecture and reuse centric.

Reduces time to market and cost by isolating the development, deployment and maintenance of enterprise components. ECP not only supports high levels of concurrent development but also leverages internal skills and a cost effective, consumer-producer model for iterative incremental system development.

Provides component frameworks and templates for the development of additional components to further reduce time to market and costs of development, and reduce the learning curve and burden on developers and architects.

Provides a logical component repository and component transporter that to enable easy sharing of components, installation management, and incremental upgrades over time.

Covers the entire lifecycle of enterprise components from design through definition, development, assembly, execution, to management.

Enables efficient leverage of existing solutions, prefabricated components and architectural artifacts when developing new custom enterprise components.

Allows for the efficient evolution of installed solutions through an inherently flexible architecture, supporting adaptability, integration and collaboration through open standards and technologies.

BRIEF DESCRIPTION OF THE DRAWINGS

These and other objects, features and advantages of the present invention are better understood by reading the following detailed description of the preferred embodiment, taken in conjunction with the accompanying drawings, in which:

FIG. 11 is a diagram of the component repository; and

FIG. 12 is a diagram of the transport between component layers in the preferred embodiment.

DETAILED DESCRIPTION OF PRESENTLY PREFERRED EXEMPLARY EMBODIMENTS

Figure 1:
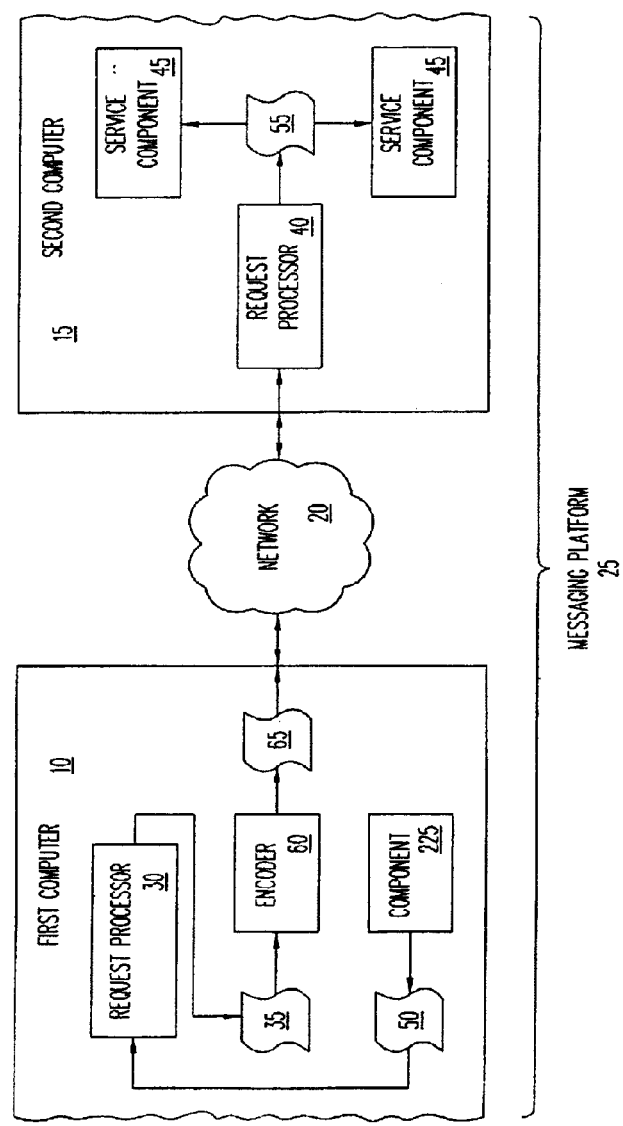
FIG. 1 is a system view of two computer systems communicating according to a preferred embodiment of the present invention.

An overall diagram of a preferred embodiment of the present invention is shown in FIG. 1. On perhaps a topmost level, the system includes a first computer system 10 which can communicate with a second computer system 15 over a communication network 20. The network 20 may be a dedicated one between the two systems. It may include other computer systems which are not involved in communications between the first and second computer systems and are not shown in the Figure for simplicity and ease of explanation. The network 20 may be an external network such as a distributed communication network such as the Internet. The first and second computer systems 10 and 15 may interface directly with the network 20, or they may be connected to the network via proxies, servers or the like. All of these variations are deemed to be within the scope of the present invention.

An enterprise component may be thought of as any piece of software that is specified, constructed and deployed as a discrete unit. It is a unit of composition for larger scale components and may itself comprise other components. A component offers a set of services to its consumers and itself may rely on another set of services. It may be distributed in nature and may execute over one or more processes in a heterogeneous computing environment. The messaging platform enables the sharing of enterprise component services existing within the enterprise as well as those existing in other, networked enterprise systems.

Figure 2:
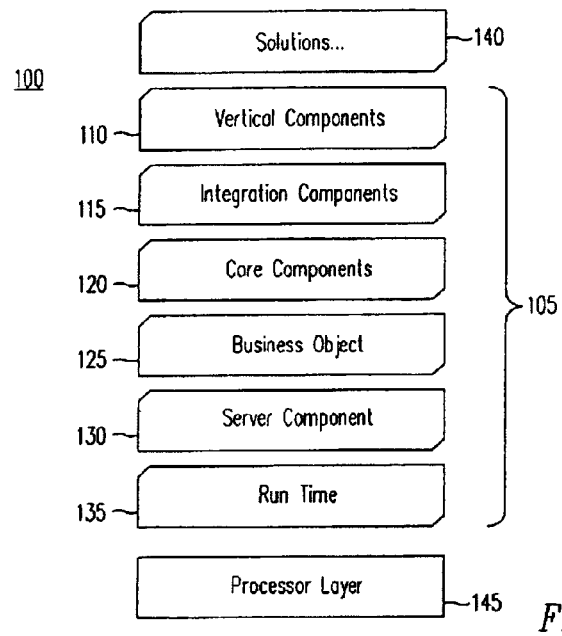
FIG. 2 is a diagram of component layers in the preferred embodiment.
Figure 9:
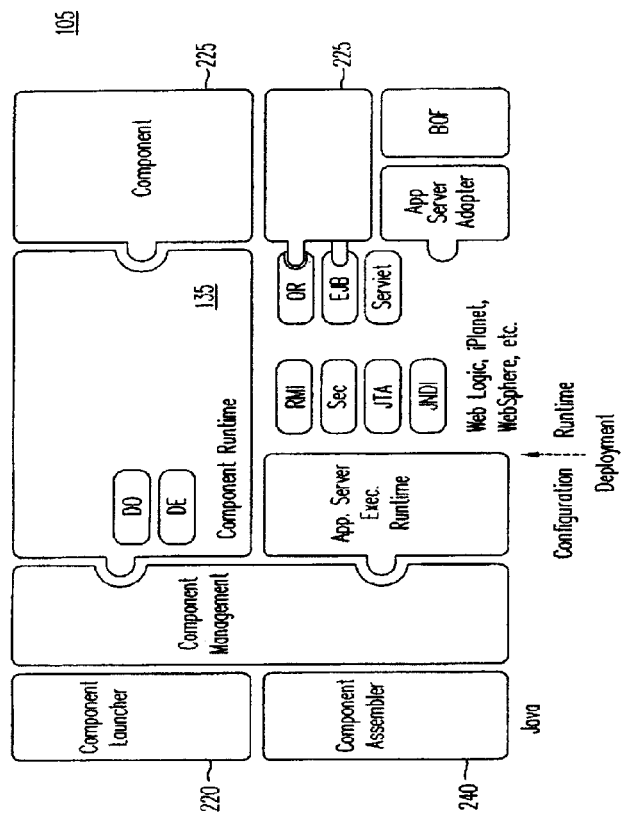
FIG. 9 is a block diagram of elements of a component platform according to the preferred embodiment.

To facilitate the above functionality, the preferred embodiment of the present invention provides a component platform 105 (see FIGS. 2, 9 and 12) encompassing an open set of technologies and tools 110–135 working in unison to realize enterprise component-based development. The component platform 105 is an architecture for the development and management of enterprise-scale multi-tier, multi-user applications 100. It defines the services and facilities as well as the structure in which components can execute. Along with the processor layer 145 and custom layer 140, it provides an extensible platform for the construction, management, deployment, execution, evolution and execution of component-based software.

Component platform tools 110–135 are completely open and easily extensible. The elements of the component platform 105 are preferably written in Java or a similar language to make them largely platform independent to maximize their utility. Metadata required by the tools 110–135 is stored in an XML file called the component repository within the file system in an organized fashion to allow developers to integrate other tools at will. Component metadata is implementation- and application-specific; however, it will generally include the following:

name or other identification information;

component category and classification, e.g., GUI, Server, Viewer, etc.;

dependencies (if the particular component must have access to another component in order to operate properly; and version or replacement histories, deployment information and the like.

It should be noted here that the component repository is maintained by the system to reflect the most current component dependency situation. That is, assume a first component A indicates in its metadata dependency information that it is dependent on a second component B, i.e., A must have access to B in order to function properly. If the component repository then receives a third component C which its deployment information indicates is to replace component B, component A's metadata dependency information is update to reflect that it is now dependent on component C.

Figure 3:
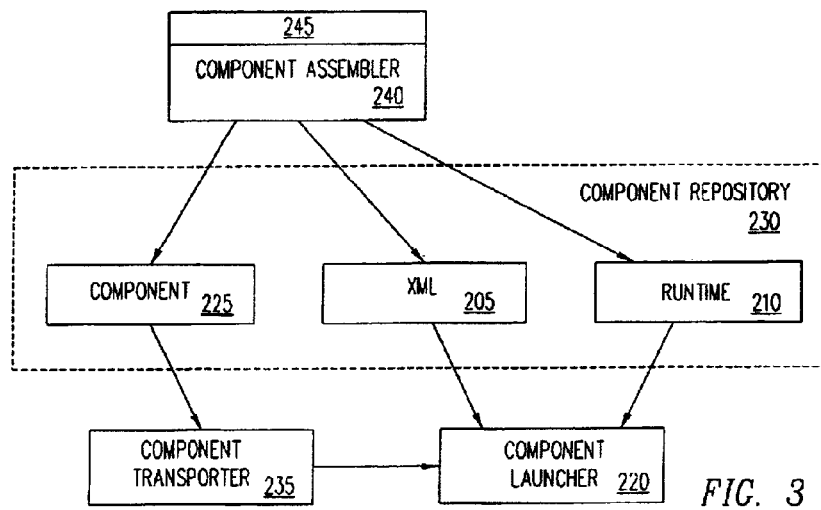
FIG. 3 is a block diagram of elements of a component platform according to the preferred embodiment.
Figure 4:
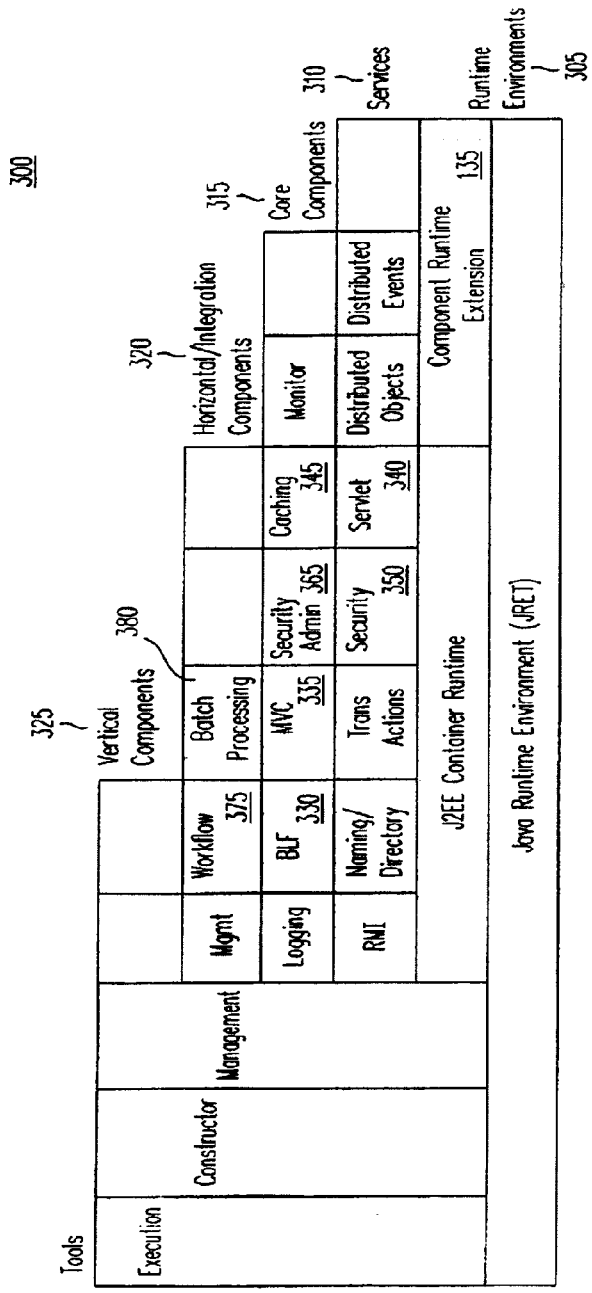
FIG. 4 is diagram of a component hierarchy in the preferred embodiment.

Management of components is described through their dependency specification, versioning and deployment. The component platform 105 enables specification of component versions, type information, structures and relationships for a heterogeneous, distributed computing environment. These semantics are specified and associated with the component 225 (see FIG. 3) in a tool called the component assembler 240. The component assembler 240 captures this information in XML files 205 and generates cross-platform scripts and command launch items 210 that are interpreted at execution time by a component launcher 220. These scripts and launch items and convert the general component specifications from the component assembler 240 into a platform-specific runtime package. For example, given a component description from the component assembler 240, the scripts may convert the component description to a Java description or a C++ DLL description. This allows developers to build and manage macrocomponents including a variety of software elements such as JSP/servlets, HTML pages, EJBs, JavaBeans and supporting Java framework classes. Additionally, OS executables can be developed within the same environment so that non-Java components can be managed as well.

Every system participating in component execution must include a component repository 230 (shown in FIG. 11) which physically hosts all its components 225. The component repository 230 has two sections, a component data section where the components 225 are stored, and a shared data section which holds data to be shared between components as well as data that may be dynamically changed at runtime.

All components 225 in the component platform 105 must adhere to a certain physical structure in the file system 230. This structure includes an organization of directories and supporting metadata files. The tools in the component platform 105 logically look at this structure as a component repository 230. This approach enables the component platform tools 110–135, as well as development tools such as IDEs, versioning tools and testing tools, to work with components 235 in an open, non-intrusive manner.

Component supplements, including source code, DLL/DML scripts, documentation, online help, design models and test scripts can be managed together with the executable binaries for the component 235 and made available where appropriate.

Completed components 225 can be distributed to the component repository for developers to assemble larger components or for applications for upgrades via the component transporter 235. The component transporter 235 serves as a catalog of components 235 made available to appropriate users. This may be done when a component 225 is executing and the component transporter 235 obtains a component having certain characteristics which the executing component indicates it needs, or it may be done when a new component is installed to determine what other components are available to it. Access may be limited to particular users with a user authentication and restriction scheme as is known in the art.

When components 225 are installed from the component transporter 235 into the component repository 230, install scripts are executed to set up additional information for the component 225 in metadata. Similarly, uninstall scripts are executed to clean up behind the component 225 when it is removed from the component repository 230. New components declared to be backward compatible with existing components 225 in the repository can automatically replace the older version upon installation of the new version.

The component assembler tool 240 gives developers a way to create new types of components 225 by offering a number of predefined templates and wizards 245. These can be used to get a starting code line that includes all necessary relationships and versioning information pre-populated. Further, custom templates can be created to extend the assembler. Further development of the components 225 may be done by software development tools as is known in the art.

Java Remote Method Invocation (RMI)-based distributed components 345 can be built based on the component runtime 135, and the component builder tool can be used to specify remote interfaces and provide an interface for writing remote callable Java objects. The builder generates code complying with the component runtime 135; for example, it might include Java source codes. This is in contract to the component assembler 240, which attempts to generate components 225 in a platform and deployment environment agnostic format, using metadata and the like.

A large part of many project developments is spent in hand coding object-to-schema mapping. The component platform's constructor tool is a tool for mapping component data to relational database or XML schema. It is used to describe the mapping relationships between business objects (lower level object which may be used to develop components) and relational tables, or standard XML schema definitions. Inheritance, association and aggregation techniques between business objects are supported.

Figure 6:
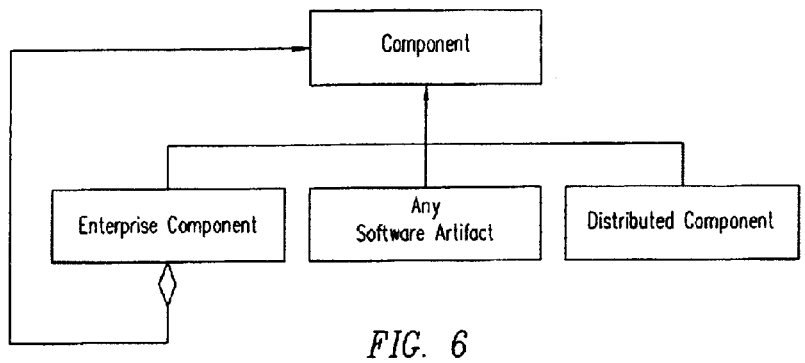
FIG. 6 shows granularity of structures in the preferred embodiment.
Figure 8:
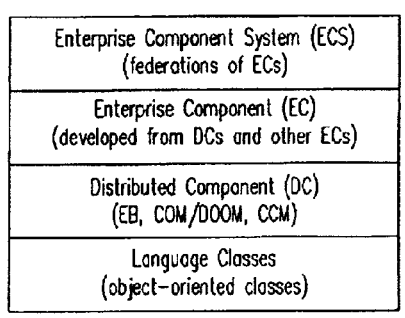
FIG. 8 shows granularity of structures in the preferred embodiment.

As shown in FIGS. 6 and 8, enterprise components are larger in terms of granularity than distributed components, but are always constructed of other components. For example several individual distributed components might be combined to provide a more meaningful business service that would be classified as an enterprise component. Enterprise components are capable of spanning multiple tiers of architecture (user services, web services, business services, and data services), and offer the ability to partition and deploy in a flexible manner, executing over one or more processes in a heterogeneous environment. While enterprise components themselves don't dictate a physical environment or architecture, their more granular constituents may dictate its deployment configuration into a physical architecture/environment. Enterprise components themselves are units of composition meaning their constituents can be other enterprise components. This allows for component to be developed as white-box or black-box components at differing levels of granularity.

Enterprise components can themselves be a unit of composition for larger scale components, and/or can be associated to form federations of components that support major aspects of an enterprise's business.

Figure 7:
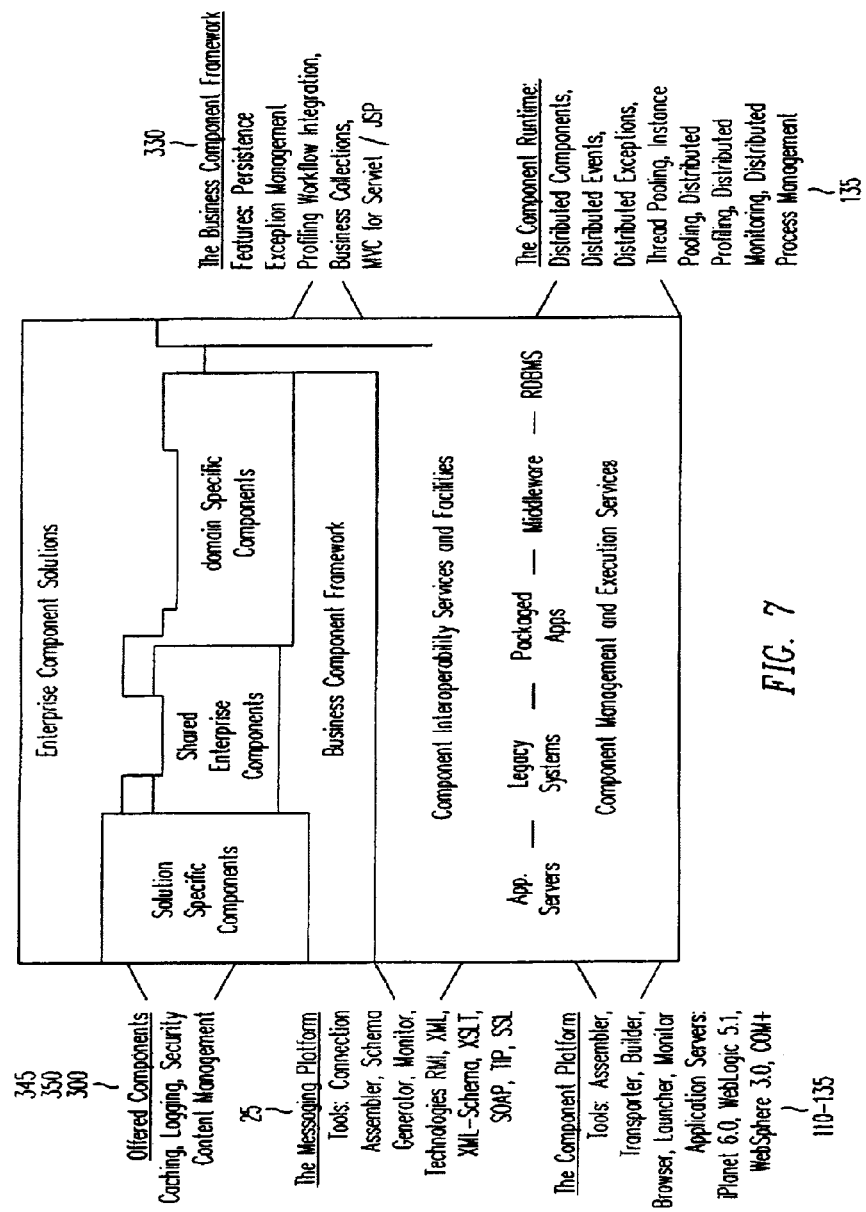
FIG. 7 is a diagram of elements and component layers of an enterprise component platform according to the preferred embodiment.

The component runtime component 135 (see also FIG. 7) manages execution of distributed components across supported runtimes such as component runtime, WebLogic runtime by BEA Systems, Incorporated of San Jose, Calif. USA, and OS runtime. Features such as version management are made possible via the component runtime 135. Thus, the runtime component 135 can handle components integrated at different levels for different runtime models. These can then be transparently integrated into runtime packages based on standard component models such as J2EE or COM+. This may not be necessary for the component runtime package if it is able to understand the components without integration.

Frameworks, through the implementation and aggregation of patterns, answer both the limitations of class libraries in supplying an architectural infrastructure and reusable design. The architectural infrastructure of a framework dramatically decreases the amount of lower level plumbing code that the developer has to implement and understand. It defines the overall structure of an application, the partitioning into classes and objects, the key responsibilities thereof, how the objects collaborate, and most importantly accepts the responsibility for the control and flow of execution. By taking over the responsibility for the execution control of an application, and removing this responsibility from the developer and the code he has to implement, the developer can focus his efforts on the particular business problem at hand.

A framework should emphasize design reuse over code reuse. A framework should reduce design decisions. The use of frameworks means the reuse of a main body of code and development of the functionality it calls. Developers therefore must code within specified interfaces defined by the frameworks, which reduces the number of design decisions they have to make. Also, a framework should standardize the application structure. Through the defined interface that frameworks use to call back to application-specific functionality, applications built using frameworks have similar structures and are therefore more consistent and easier to maintain. A framework also should be extendable by domain designers. Customization is achieved through sub-classing abstract classes or implementing interfaces from the individual frameworks.

The business component framework 330 provides the infrastructure to build transactional business components consistently across a variety of execution environments and transactional resources, including servlet engines 340, EJB containers and component runtime 135. Due to its modular, layered implementation the business component framework 330 enables incremental construction of complex server behavior encompassing caching 345, concurrency, security 350 and the like. Complex relationships of business objects, including inheritance, association and aggregation can be transacted consistently while maintaining atomicity, consistency, identity and durability (ACID) properties in the object world. Persistence implementation is flexible and enables advanced performance enhancements like lazy instantiation for incremental retrieval.

Business collections enable business transactions to be performed on a collection of business objects instead of on each individual business object. This considerably simplifies coding and improves performance, as each operation on a collection can be a single transaction. The state of each object in the collection is maintained so that when a series of changes to the collection is saved, only the necessary operations are performed on the objects in the collection. Typical collection operations like sort and search are well-defined by following standard patterns consistent with the Java collections framework.

Another alternative is the high transaction batch processing framework 380. It provides the architectural foundation to building high speed, high volume, file-to-file, file-to-dB and dB-to-file batch jobs in Java. This framework includes a COBOL-based API syntax for extremely flexible manipulation of data structures; buffered file reads and writes for very high operational speeds; and targeting to high speed and ease of use in an object-oriented programming environment.

The preferred embodiment of the present invention preferably additionally includes a logging component 360 which provides an API to write log messages to the shared data area of the component repository that can be filtered by an application-defined criteria and criticality at execution time. The events that are logged are application-specific and user-chosen; typically, events such as user logins and logouts, error exception conditions and the like might be included in the events logged. Messages from the logging component 360 can be written to any user-defined output stream. XML output formatting of the XML-formatted logging data can be turned on to provide filtered viewing. Log messages from various sources can be consolidated to track distributed transactions. That is, logging components 360 in a number of enterprise systems could be configured to report logged events to a single shared data repository, from which the data could be consolidated to follow the progress of a distributed process through the enterprise systems.

Additionally, a caching component 345 provides a service to cache any type of Java objects in a distributed environment. The caching mechanism is delivered through the creation of application-defined cache managers within a Java Virtual Machine (JVM) that coordinates cached objects. The caching component includes functionality for multiple key cache access; partitioning based on class; Least Recently Used (LRU) memory management; singleton RMI read/write cache; multi-JVM remote administration; and administration tools and statistics.

A security component 350 provides a complete set of classes for implementing robust security architectures, extending Java security models to provide a consistent set of security APIs for all application elements. Along with a security administration component 365, the security component 350 simplifies the implementation of security for a three-tier architecture having a user services tier, a business services tier and a data services tier, and automatically and seamlessly handles simple security constraints while its robust Access Control List (ACL)-based architecture ensures that the most sophisticated security requirements can be properly encapsulated. The security component includes authorization services available to servlets 340, EJBs and other application objects; a servlet authentication service; and generic security constructs based on ACL, permissions and roles.

A workflow component 375 offers integrated workflow capabilities that enable the separation of application logic from process logic. The workflow component 375 introduces the concept of a business process object, which represents a set of one or more linked tasks. Each task created within a business process is represented by a business activity object. The vendor-specific session context is contained within a generic workflow source manager to isolate the developer from vendor-specific APIs and permit the workflow objects to be mobile. The workflow component 375 includes business activity and business process strategizable objects; a workflow session manager; independence from vendor-specific workflow engine APIs; and support for the Verve process engine from Verve, Incorporated of San Francisco, Calif. USA.

Core technical components 315 provide a solid technical foundation for building robust, high performance, secure, complex, large-scale components. Core components 315 offer technical services common to all applications 140. They are comprehensive in their applicability and customization is not required.

Horizontal/integration components 320 integrate diverse execution models consistently. Horizontal/integration components define the interface and protocol between disparate execution models. Like the core technical components 315, they are comprehensive and customizations are not required.

Horizontal/integration components 320 may be used in workflow 375, e.g., Verve and Conductor (made by Epicor Software Corporation of Irvine, Calif. USA and Forté Software of Oakland, Calif. USA) architectures; browser interfaces, e.g., JSPs and servlets; packages such as Ariba (From Ariba Corporation of Mountain View, Calif. USA), SAP and Peoplesoft (Pleasanton, Calif. USA); MOM integration, e.g., MQ and MSMQ technologies; communication mechanisms such as e-mail and fax; dynamic pricing and auction modules, e.g., Moai (San Francisco, Calif. USA); content management such as Open Market (Burlington, Mass. USA); and personalization such as NetPerceptions (Eden Prairie, Minn. USA).

A vertical component 325 defines a specific business problem which it addresses. It may or may not need customization. Vertical components may be non-industry specific, e.g., e-commerce, knowledge management, bill presentment, and customer relationship management; or industry-specific, e.g., telecommunications, financial services, healthcare, retail, manufacturing, entertainment, and procurement. For example, vertical components in a procurement application may include components addressing specific aspects of shipping, tax, orders, party/organization/person, business role, fulfillment plan, inventory items, role profiles, and contact relationships.

Component invocation integration is the sharing of component services that may exist within an enterprise or outside the enterprise. By allowing access to services provided by components contained inside or outside any given application, organizations are able to share both data and processes among many logistical applications and therefore integrate those logical applications into larger applications. While component invocation integration is the most flexible and desirable level of integration, it is also the most difficult to achieve. For component integration to be feasible there needs to be a common protocol for component communication.

Figure 10:
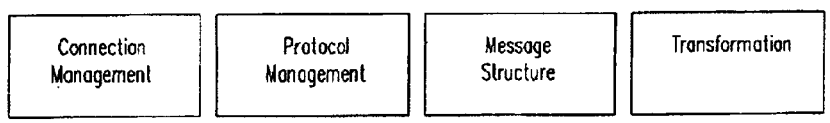
FIG. 10 is a block diagram of elements in a messaging platform according to the preferred embodiment.

The present invention solves the above problem by providing a messaging platform for communication between components. A messaging platform 25 is shown in FIG. 10 and is formed by parts of the first and second computer systems 10 and 15 and the network 20. The messaging platform 25 is a middle layer in a multi-tier communication architecture such as the one shown in FIG. 2 and facilitates communication between system components such as the first and second computers 10 and 15. The messaging platform preferably has three main parts: a request processor 30 which receives a request 50 for a component service (possibly in a format not understandable by any component providing that service) from a component 225 operating on the first computer system 10, validates it, converts it to a message 35 having a platform- and runtime-independent representation, and passes it to the network 20; a transport mechanism, i.e., the network 20, for conveying the message from the first computer 10 to the second computer 15; and a request processor 40 in the second computer 15 for receiving the message, converting it to a form 55 usable by the second computer system 15 and providing it to a service component 45 of the second computer system 15 which can provide the requested service.

Figure 5:
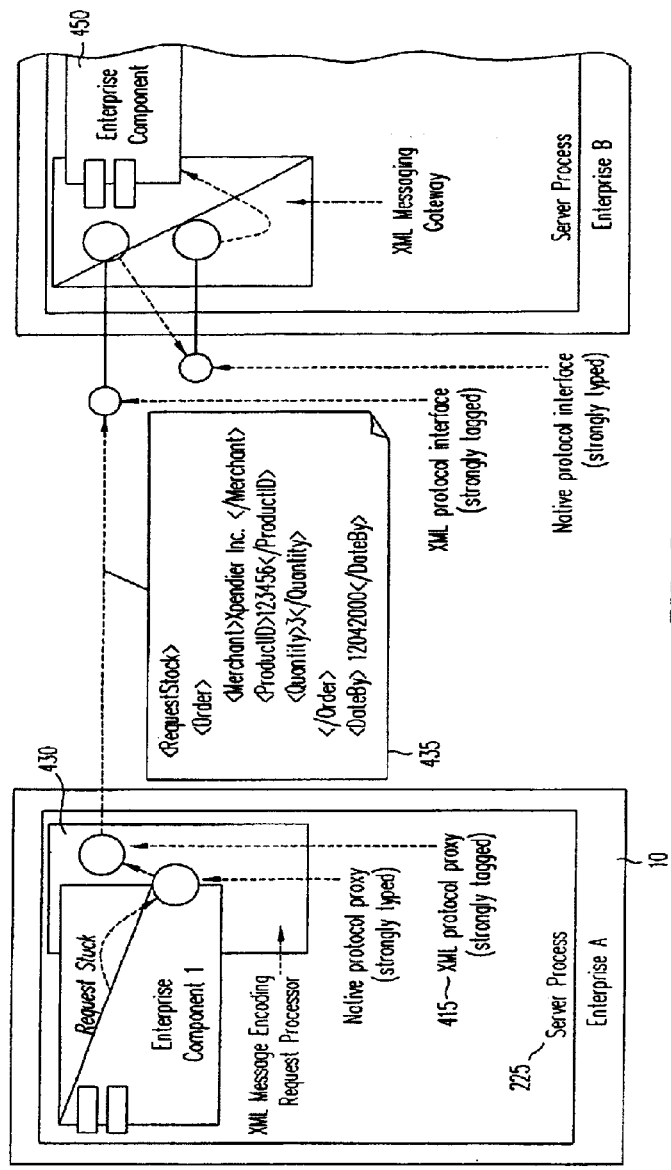
FIG. 5 is a diagram of a lookup process according to the preferred embodiment.

During initialization of the service routine 45 or at another appropriate time, as shown in FIG. 5 the service routine 45 registers with its request processor 40 to notify the processor 40 of the services offered to other system components by the service component 145 in Step 405 for validation purposes. This is done by providing the request processor 40 with the service routine's entry points, i.e., calls to invoke the advertised functionality, as well as other information to distinguish the component 45 from other service components 45 providing the same services. The service component 45 also provides the request processor 40 with various parameters including a description of the advertised functionality through a distributed component interface. The request processor 40 saves the parameters and their structure so that it can validate requests that are subsequently made of the service component 45.

When a component in the first computer system 10 wants to ask that a service component to provide some service, it sends a component invocation request to that effect to its request processor 30 in Step 410. This is a native language message which is intercepted by the request processor 30 and converted to XML or another common format in Step 415. In Step 415 the lookup service 430 finds a component that is able to complete the requested service. The component selection can be refined based on other criteria accompanying the request and known attributes of the component as described above. Additionally, the selection may be made on real-time dynamic information relating to each service component 45, e.g., queue depth, average compute time and network latency. Based on this, the lookup service 430 sends the XML message to the identified component 45 in Step 435. The XML message is then received and processed by the receiving system.

The component invocation request 410 and any associated parameters are serialized by the messaging platform 25 in Step 425 so that they may be converted to a platform- and runtime-independent format 35 suitable for transmission over the network 20. In the preferred embodiment, the transmission format 35 is the Extended Markup Language (XML) and an example request is shown in FIG. 5. As is known in the art, XML is a subset of the Standard Generalized Markup Language (SGML) designed especially for web documents. It allows system architects to create customized tags which enable the definition, transmission, validation and interpretation of data between different entities. Once the component invocation request has been coded in XML, it can be accessed and used by any computer system capable of receiving the request and converting it to its own internal format for further processing.

Translation of a service request 35 into XML may be done by an automatic software gateway on the first computer 10 side of the messaging platform 25 or by a separate encoding processor 60 as described below. To guarantee the uniform interpretation of the service request 35 and any accompanying parameters a generic XML vocabulary is necessary. The request can then be parsed and understood by the remote component gateway.

Preferably, to accomplish this task the encoding processor 60 in the messaging platform 25 converts the XML documents 35 into transmissible objects 65 using the Simple Object Access Protocol (SOAP), which uses the Hypertext Transfer Protocol (HTTP) as the transport mechanism and the serialized XML document 35 as the payload. SOAP provides a way for applications to communicate over the Internet independent of their platforms. SOAP specifies how to encode an HTTP header and an XML file so that a program in one computer can call a program in another computer using an appropriate transmission medium, pass it information, and possibly receive a reply from the recipient. In the preferred embodiment, the transmission medium is the Internet which is used as network 20. A sample SOAP-encoded request might be

```
POST /StockQuote HTTP/1.1
Host: www.stockquoteserver.com
Content-Type: text/xml; charset="utf-8"
Content-Length: nnnn
SOAPAction: "Some-URI"
<SOAP-ENV:Envelope
    xmlns:SOAP-ENV="http://schemas.xmlsoap.org/soap/
      envelope/"
    SOAP-
ENV:encodingStyle="http://schemas.xmlsoap.org/soap/en-
coding/">
    <SOAP-ENV:Body>
        <m:GetLastTradePrice xmlns:m="Some-URI">
            <symbol>DIS</symbol>
        </m:GetLastTradePrice>
    </SOAP-ENV:Body>
</SOAP-ENV:Envelope>
```

Another benefit provided by the use of SOAP should not go unmentioned. The use of SOAP allows system communications to generally pass through system firewalls and thus provides expanded usability. Most distributed object protocols suffer from firewall blockages because they transmit over ports which are blocked by the firewalls. However, most firewalls pass traffic on port 80, the channel on which most HTTP communications, such as those generated by SOAP, are conducted. Thus, HTTP-encoded transmissions such as the above can easily pass through.

It should be noted that as an alternative to HTTP transport, the invention may employ HTTP authentication mechanisms as well as SSL for secure channel communications (using HTTPS).

The preferred embodiment also includes a translation component (not shown) which uses an Extensible Stylesheet Language (XSL) that allows users to implement SOAP for encoding objects. For systems that do not use SOAP, XSL provides a way to transmit information in the format that the system understands. In the preferred embodiment, the XSL engine is Saxon 4.5. Other known standard XML vocabularies may be used in place of SOAP or XSL, e.g., XML_RPC or COINS (this assumes that both communicating systems speak XML_RPC, COINS, etc.). Such variations will be understood as being within the scope of the present invention.

Finally, in Step 425 the messaging platform 25 uses the HTTP protocol to transport the SOAP-encoded XML message 65 over the Internet 20 between the first and second computers 10 and 15. Address information from this purpose comes either from component metadata or data from the request processor 40. It also is affected by the type of protocol being used—for example, connectionless protocols such as SOAP which do not require a full connection model may not need such information, while connected protocols such as Java RMI may need this additional information.

When the second computer 15 receives the transported XML document 65 from the network 20, its request processor 40 checks to see if the destination service component 45 identified therein is a registered component on that system. If not, or if the service component 45 is in fact registered but the request 35 does not have the correct format, number of parameters or the like, an appropriate error message is returned to the first computer 10 (again, in a SOAP-encoded XML format). The error message preferably specifies the nature of the error. If, however, the service provider 45 is properly registered and formatted, the component invocation request 35 is passed to the service component in question to be processed.

The connection assembler is used to create, manage, and manipulate messaging platform connections. These include connections from external systems to the messaging platform and from the messaging platform to external systems. For example, there are generally two relationships components can have, aggregation and run-time connection, and the connection assembler can manage such aggregation contacts. When a Java application makes a SOAP call, for example, it expects a stub in return. If the receiving system does not speak Java, the connection assembler can take care of generating a stub to be supplied to the original Java application.

The messaging platform provides a tool called a schema generator that is used to create XML documents containing the information to be transported to another system. As is known in the art, when the syntax and semantics two systems use to communicate with each other is known in the art, an XML construct called a schema can be used to define the protocol and format messages for transmission between the systems. The schema generator also greatly simplifies the creation of the XML schema by providing a Graphic User Interface (GUI) that automates the creation of schemas and the serialization of objects. A schema is a set of predefined rules that describe a given class of XML document. A schema defines the elements that can appear within a given XML document along with the attributes that can be associated with a give element. It also defines structural information about the XML document. The schema generator's GUI provides a simple and quick way to select fields to be included in the schema and its serialized object, thus making it easy to modify schemas and serialized objects during the development process.

As an alternative to custom-made schemas using the Schema Generator above, standard schemas from organizations and standards bodies may be used, or a combination of the two may be used. Such variations will be understood to be within the scope of the present invention.

The messaging platform also includes a transport framework for the implementation of HTTP for transport. Although Messaging Platform uses the HTTP over the Internet as its default transfer protocol, open interfaces are provided to help developers implement the protocol of their choice. This is because the transport of a request done through a framework can be specific to a particular transport, e.g., HTTP, FTP, SMTP and the like.

Nearly all enterprise systems today are transactional in nature. That is, enterprise systems define functionality in terms of sets of operations, where all the operations need to succeed or fail together as a concise unit of work. Enterprise components need to be de-coupled from any specific context in which they are used, including the transactional context, but also need to maintain the ability to enroll in transactions that may start and end outside their boundaries.

The messaging platform addresses this problem by making use of the Transaction Internet Protocol (TIP). TIP enables messaging platform to achieve atomic commitment of a two-phase commit protocol between enterprise components. TIP enables the messaging platform to coordinate transaction managers from disparate systems communicated via differing protocols using a "bring your own transaction" (BYOT) mechanism. Using the BYOT mechanism, the messaging platform attaches transactional context to messages it sends and receives allowing a controlling transaction manager to coordinate sub-transactions, controlled by remote transaction managers, that have been enrolled into the original transaction. In this way, TIP can be used to allow transaction management across distributed transactions which may be distributed across the Internet or another communications network.

To enable TIP the transaction managers that want to support the protocol must map their internal transaction identifiers into this TIP format. Each transaction manager uses its own identity mechanism for its localized transaction, and the identifiers are exchanged when the relationship between Transaction Managers is established. Transaction Managers therefore use their own format of transaction identifier internally, but hold foreign identifiers for each subordinate transaction from distributed Transaction Managers involved in the distributed transaction.

Additional aspects of the messaging platform according to the preferred embodiment are described in the "Messaging Platform Overview" (June 2000) by Xpedior Products and Tools Group, contained in Appendix I and incorporated herein by reference.

Figure 13:
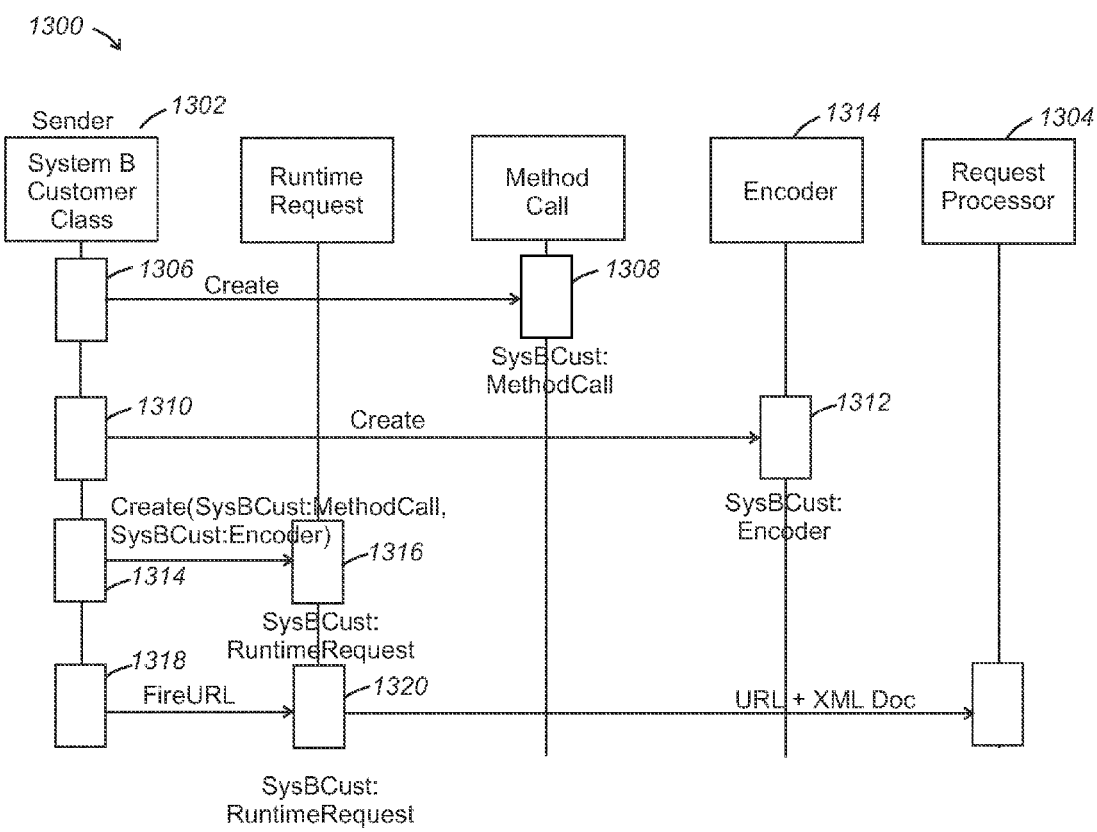
FIG. 13 shows a diagram of an embodiment of components used in a process for sending an XML document from a sender to a request processor.

Referring to FIG. 13, a diagram of an embodiment of a process 1300 by which a Sender 1302 (shown as System B Customer Class) creates an XML document and sends it to a Recipient 1402 (FIG. 14) is shown. The Sender 1302 uses a MessagingController factory class at 1306 to create a new MethodCall object at 1308. The MethodCall object identifies the method to be invoked at the Recipient 1402 and includes the parameters the Sender 1302 wishes to pass to the method. The Sender 1302 uses MessagingController at 1310 to create an Encoder object that is sent to an Encoder at 1312. The Encoder object identifies the type of encoding required by the Recipient 1402. The Sender 1302 uses the Messaging Controller at 1314 to create a new RuntimeRequest object at 1314. The MethodCall and Encoder objects are passed to the new RuntimeRequest at 1316. The Sender 1302 tells the RuntimeRequest object to run a FireURL method at 1318. At this point, the RuntimeRequest object tells the Encoder object to create a message containing the method and parameter information contained in the MethodCall object. This message is encoded in the manner required by the Recipient 1402, which is specified by the Encoder object. Since SOAP is the default Messaging Platform encoding mechanism, all encoded XML documents are considered SOAP-encoded.

The XML document is then attached to a URL, which the RuntimeRequest object sends to the Request Processsor at 1320. The URL created in this step contains information that matches part of the URL sent to the Request Processor by the Recipient 1402 during a registration process. The information that the Recipient 1402 sent in the URL at registration is saved in the Recipient's unique RuntimeRequestHandler, which is stored by the Request Processor. The URL includes the following information: http://server/mode-id/encoding-id/url+XML document.

When Sender 1302 sends information to a Recipient 1402 that resides on a different system, a connection information file is created for the Recipient 1402 that defines:
 a host on which the Recipient 1402 resides,
 a port on which the Recipient 1402 resides,
 a mode-ID,
 an encoding ID.

The name of the connection information file becomes synonymous with the name of the connection.

Figure 14:
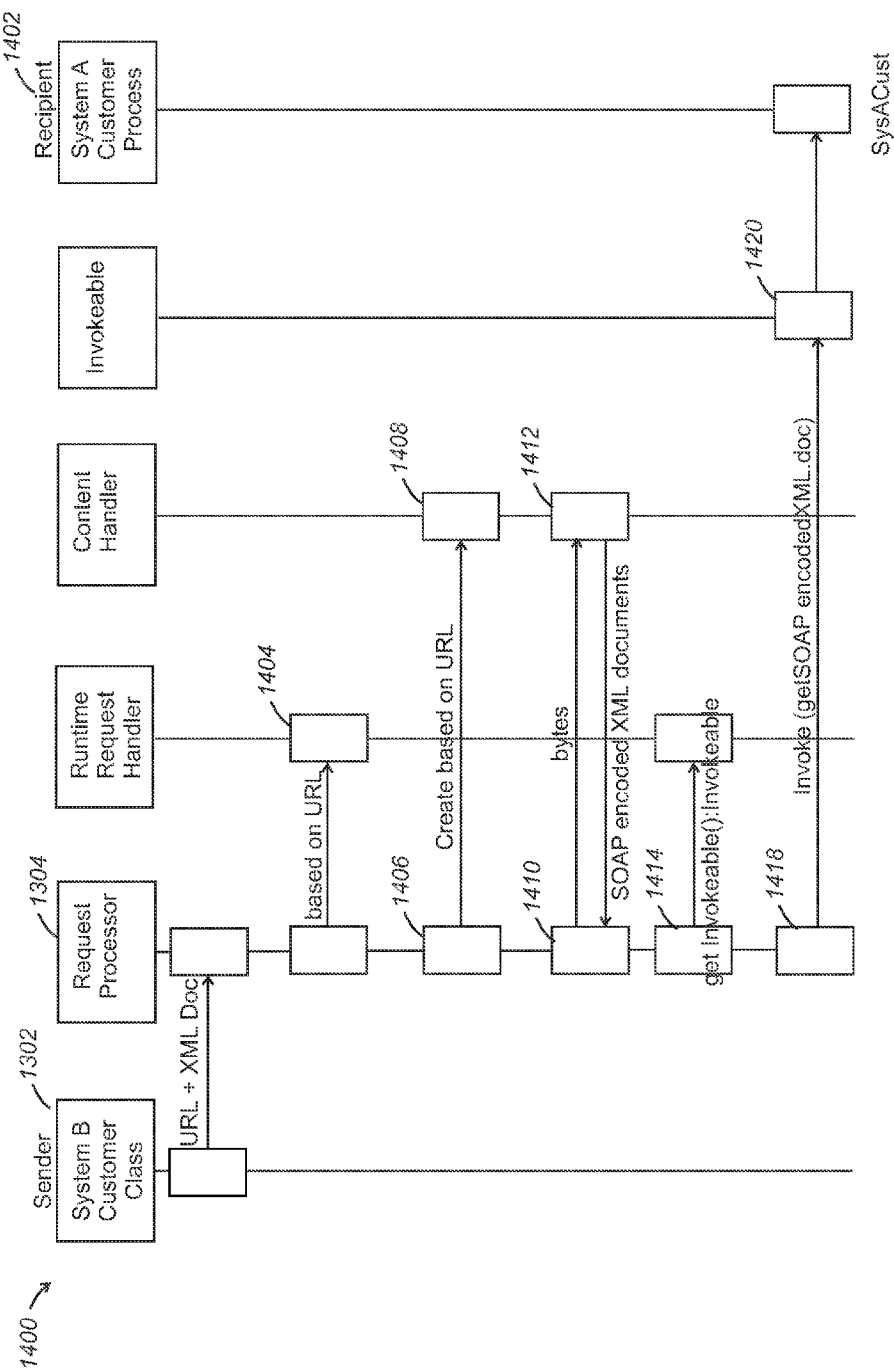
FIG. 14 shows a diagram of an embodiment of a process by which the Request Processor repackages the XML document and sends it to the recipient.

Referring to FIG. 14, a diagram of an embodiment of a process 1400 by which the Request Processor repackages the XML document and sends it to the Recipient 1402 is shown. The Request Processor receives the URL from the Sender 1302. The Request Processor 1304 identifies the name of the RuntimeRequestHandler to be used for this request at 1404. The name of the RuntimeRequestHandler corresponds to the URL-ID contained in the URL.

At 1406, the Request Processor determines the type of Content Handler that must be created for the request based on an Encoding ID included in the URL. The Request Processor then makes a new ContentHandler object for the specified Encoding ID at 1408.

When the XML document is received by the Request Processor from the network at 1410, the document is no more than a stream of bytes. This stream is converted into an object that the Messaging Platform can use. To do this, the Request Processor tells the Content Handler to run a get-Content method at 1412, which converts the stream of bytes into the appropriate object. For example, if SOAP is the encoding type, the appropriate object is a SOAP-encoded XML document.

The Request Processor tells the RuntimeRequestHandler to get an Invokeable at 1414 and then sends the data contained in the XML document created at 1408 to the Invokeable at 1420. The Request Processor tells the Invokeable to run an Invoke method, which runs the method with the parameters specified in the data contained in the XML document.

Figure 15:
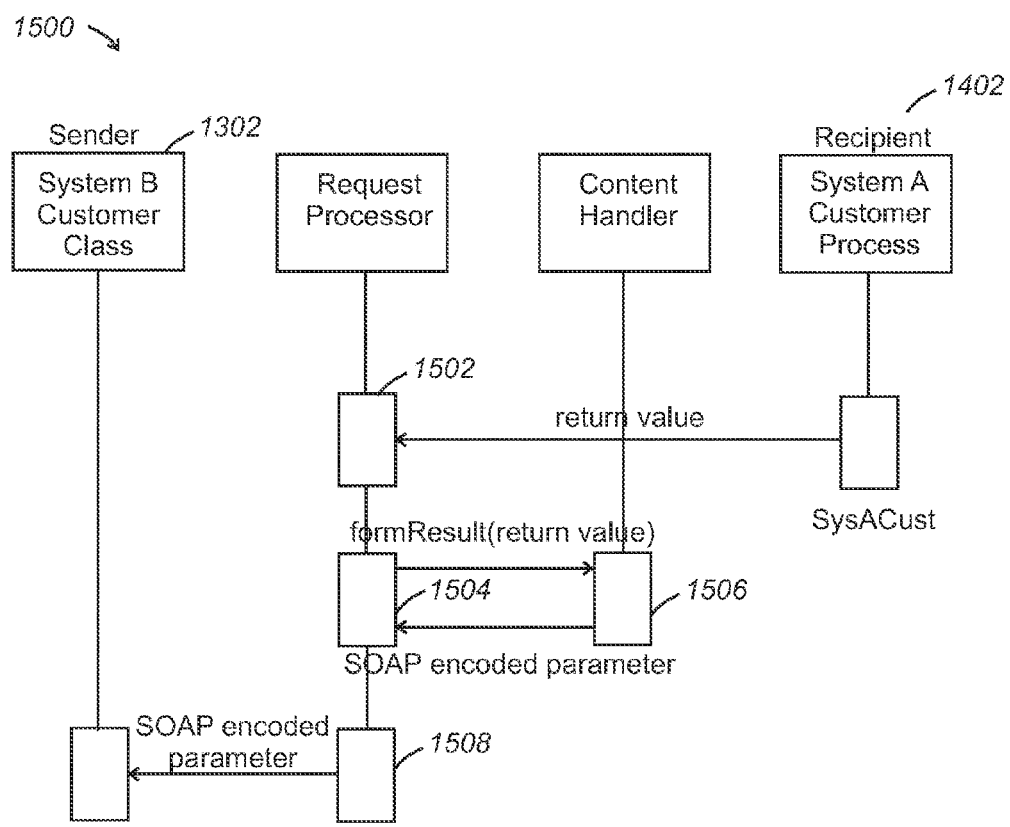
FIG. 15 shows a diagram of an embodiment of a process, which packages the recipient's return values and transmits them back to the sender.

Referring to FIG. 15, a diagram of an embodiment of a process 1500 is shown that packages the Recipient's return values and transmits them back to the Sender. The invoked method may return a value, which is sent to the Request Processor at 1502. The Request Processor sends the return value to the ContentHandler at 1504. The ContentHandler was created when the original message was sent (see at 1408 FIG. 14). The ContentHandler contains a method called for Result, which takes the return value and returns it in the particular manner required by the Sender 1302, for example, SOAP encoded. The ContentHandler sends the returned object to the Request Processor at 1506. The Request Processor sends the return value to the Sender 1508.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A messaging platform for a component-based software system, the platform comprising:
 a connection assembler for at least one of creating, managing and manipulating a first messaging platform connection;
 a protocol management framework for implementation of a predetermined transport protocol over the first messaging platform connection;
 a schema generator for, responsive to a request for service received over a second messaging platform connection, creating a document according to a predetermined format, the document containing information to be provided to another system over the first messaging platform connection;
 an encoding component for converting a document in the predetermined format into a first encoded object that can be understood and used by the other system, the first encoded object being encoded according to a default encoding protocol; and
 a translation component for encoding a document in the predetermined format into a second encoded object that can be understood and used by the other system, the second encoded object being encoded according to an encoding protocol different from the default encoding protocol.

2. The platform of claim 1, wherein:
the information is provided by a service component; and
the request for service is in a form not understandable by the service component.

3. The platform of claim 1, wherein the service request is in a platform and application-independent format.

4. The platform of claim 3, wherein the service request is in an Extensible Markup Language format.

5. The platform of claim 1, further comprising a lookup service for determining a service component to handle the service request.

6. The platform of claim 5, wherein the lookup service determines the service component to handle the service request based on information associated with the service component.

7. The platform of claim 1, wherein the protocol management framework implements HTTP for transport.

8. The platform of claim 1, wherein the default protocol is SOAP.

9. The platform of claim 1, wherein an identifier of the encoding object is included in a Universal Resource Locator (URL), and the URL is sent to the second messaging platform in combination with the document in the predetermined format.

10. An apparatus comprising:
logic instructions operable to:
  receive a service request from a sender, wherein the service request invokes a service component and provides parameters required by the service component;
  determine whether the service component invoked by the service request is available;
  determine the parameters in the service request that are required by the service component;
  create a request document that includes the parameters required by the service component based on at least some of the parameters in the service request;
  create an encoder object upon receipt of the service request, wherein the encoder object identifies a handler that translates the request document to a document format required by the service component; and
  transmit the encoder object and the request document to a system hosting the service component.

11. The apparatus of claim 10 further comprising:
logic instructions operable to:
  invoke the service component using the request document;
  receive a response from the service component in the document format required by the service component;
  convert the response to a response message in a platform-independent format;
  provide the response message to a message platform;
  convert the response message to a format required by the sender.

12. The apparatus of claim 10, wherein the encoding object is included in a Universal Resource Locator (URL).

13. The apparatus of claim 10 further comprising:
logic instructions operable to:
  create a connection information file that identifies an external host on which the service component resides.

14. The apparatus of claim 13 wherein the connection information file further identifies a port on which the service component resides.

15. The apparatus of claim 13 wherein the connection information file further identifies a transport mode and a handler that is operable to create the second document.

16. The apparatus of claim 10 further comprising:
logic instructions operable to:
  generate a Graphical User Interface (GUI) to identify and store addresses of external host computers on which service components that can be invoked by the sender reside.

17. The apparatus of claim 10 further comprising:
logic instructions operable to:
  generate a repository of information regarding the service component, wherein the repository includes at least one of the group consisting of: an identifier, a classification, dependencies, and version of the service component.

18. The apparatus of claim 17 wherein the repository includes a component data section and a shared data section, and the shared data section includes information that can be shared between service components and changed dynamically at runtime.

19. The apparatus of claim 10 further comprising:
logic instructions operable to:
  create a catalog of components in the repository, wherein the catalog can be accessed by authorized users.

20. The apparatus of claim 10 further comprising:
logic instructions operable to:
  generate instructions to specify remote interfaces and provide an interface for writing remote objects.

21. The apparatus of claim 17 further comprising:
logic instructions operable to:
  map relationships between objects in the service components.

22. The apparatus of claim 10 further comprising:
logic instructions operable to:
  implement a transaction protocol to coordinate transactions from disparate systems communicated via different protocols.

23. The apparatus of claim 10 wherein further comprising:
logic instructions operable to:
  select the alternate service component based on at least one factor of the group consisting of: queue depth, average compute time, and network latency.

* * * * *